US012608261B2

(12) United States Patent
Shwartz et al.

(10) Patent No.: US 12,608,261 B2
(45) Date of Patent: Apr. 21, 2026

(54) ESTIMATING PROPAGATION TIME FOR AN INJECTED FAULT

(71) Applicant: INTERNATIONAL BUSINESS MACHINES CORPORATION, Armonk, NY (US)

(72) Inventors: Larisa Shwartz, Greenwich, CT (US); Saurabh Jha, White Plains, NY (US); Jesus Maria Rios Aliaga, Philadelphia, PA (US); Eitan Daniel Farchi, Pardes Hanna-Karkur (IL); Frank Bagehorn, Dottikon (CH); Robert Filepp, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 18/127,711

(22) Filed: Mar. 29, 2023

(65) Prior Publication Data

US 2024/0330093 A1    Oct. 3, 2024

(51) Int. Cl.
*G06F 11/00*        (2006.01)
*G06F 11/07*        (2006.01)

(52) U.S. Cl.
CPC ........ *G06F 11/0775* (2013.01); *G06F 11/079* (2013.01)

(58) Field of Classification Search
CPC ... G06F 11/0775; G06F 11/079; G06F 11/341
See application file for complete search history.

(56) References Cited

U.S. PATENT DOCUMENTS

| | | | | |
|---|---|---|---|---|
| 9,270,557 B1 * | 2/2016 | Shpilyuck | ........... | H04L 41/5025 |
| 11,934,258 B1 * | 3/2024 | Kasaiezadeh Mahabadi | .............. | B60W 50/0205 |
| 2009/0089805 A1 * | 4/2009 | Srinivasan | .......... | G06F 11/3466 719/318 |
| 2010/0017791 A1 * | 1/2010 | Finkler | ............... | G06F 11/3636 719/318 |

(Continued)

FOREIGN PATENT DOCUMENTS

CN        110262972        12/2020

OTHER PUBLICATIONS

Fault propagation timing (Year: 1988).*

(Continued)

*Primary Examiner* — Philip Guyton
*Assistant Examiner* — Sean Kevin McNamara
(74) *Attorney, Agent, or Firm* — Seed Intellectual Property Law Group LLP

(57)        ABSTRACT

A method, system, and computer program product for estimating propagation time for an injected fault are configured to: determine normal execution times of respective services in a call graph of an application; determine normal execution times of respective network communications between ones of the services; determine faulty execution times of respective ones of the services; and generate a propagation time for a particular type of fault injected at a particular fault injection location in the call graph based on the determined normal execution times of respective services, the determined normal execution times of respective network communications, and the determined faulty execution times of respective ones of the services.

12 Claims, 4 Drawing Sheets

100 ⌐

COMPUTER 101
PROCESSOR SET 110
PROCESSING CIRCUITRY 120    CACHE 121
COMMUNICATION FABRIC 111
VOLATILE MEMORY 112
PERSISTENT STORAGE 113
OPERATING SYSTEM 122
PROPAGATION TIME ESTIMATION CODE
200
PERIPHERAL DEVICE SET 114
UI DEVICE SET 123    STORAGE 124    IoT SENSOR SET 125
NETWORK MODULE 115
WAN 102
END USER DEVICE 103
REMOTE SERVER 104
REMOTE DATABASE 130
PRIVATE CLOUD 106
GATEWAY 140
PUBLIC CLOUD 105
CLOUD ORCHESTRATION MODULE 141    HOST PHYSICAL MACHINE SET 142
VIRTUAL MACHINE SET 143    CONTAINER SET 144

(56) References Cited

U.S. PATENT DOCUMENTS

| | | |
|---|---|---|
| 2017/0024299 A1 | 1/2017 | Deng et al. |
| 2022/0188219 A1* | 6/2022 | Hicks .................. G06F 11/3692 |
| 2023/0040564 A1 | 2/2023 | Wang et al. |
| 2023/0208855 A1* | 6/2023 | Sheriff ................ H04L 41/0631 |
| | | 726/22 |

OTHER PUBLICATIONS

Shin et al, ault propagation timing (Year: 1988).*
Lee et al., "Eadro: An End-to-End Troubleshooting Framework for Microservices on Multi-source Data", arXiv preprint arXiv:2302. 05092, Feb. 10, 2023, 13 pages.
Anonymous, "A Method to Inject Faults Into an Application", IP.com No. IPCOM000140338D, Sep. 8, 2006, 4 pages.
Bagehorn et al., "A fault injection platform for learning AIOps models", In 37th IEEE/ACM International Conference on Automated Software Engineering, 2022, 5 pages.
Grabarnik et al., "Management of Service Process QoS in a Service Provider—Service Supplier Environment", In The 9th IEEE International Conference on E-Commerce Technology and The 4th IEEE International Conference on Enterprise Computing, E-Commerce and E-Services (CEC-EEE 2007), IEEE, Aug. 2007, 8 pages.
Rios et al., "Localizing and Explaining Faults in Microservices Using Distributed Tracing", 2022, 11 pages.
Garcia Solla, "What is a Call Graph? And How to Generate them Automatically", https://www.freecodecamp.org/news/how-to-automate-call-graph-creation/, archived on Mar. 7, 2023, 24 pages.

* cited by examiner

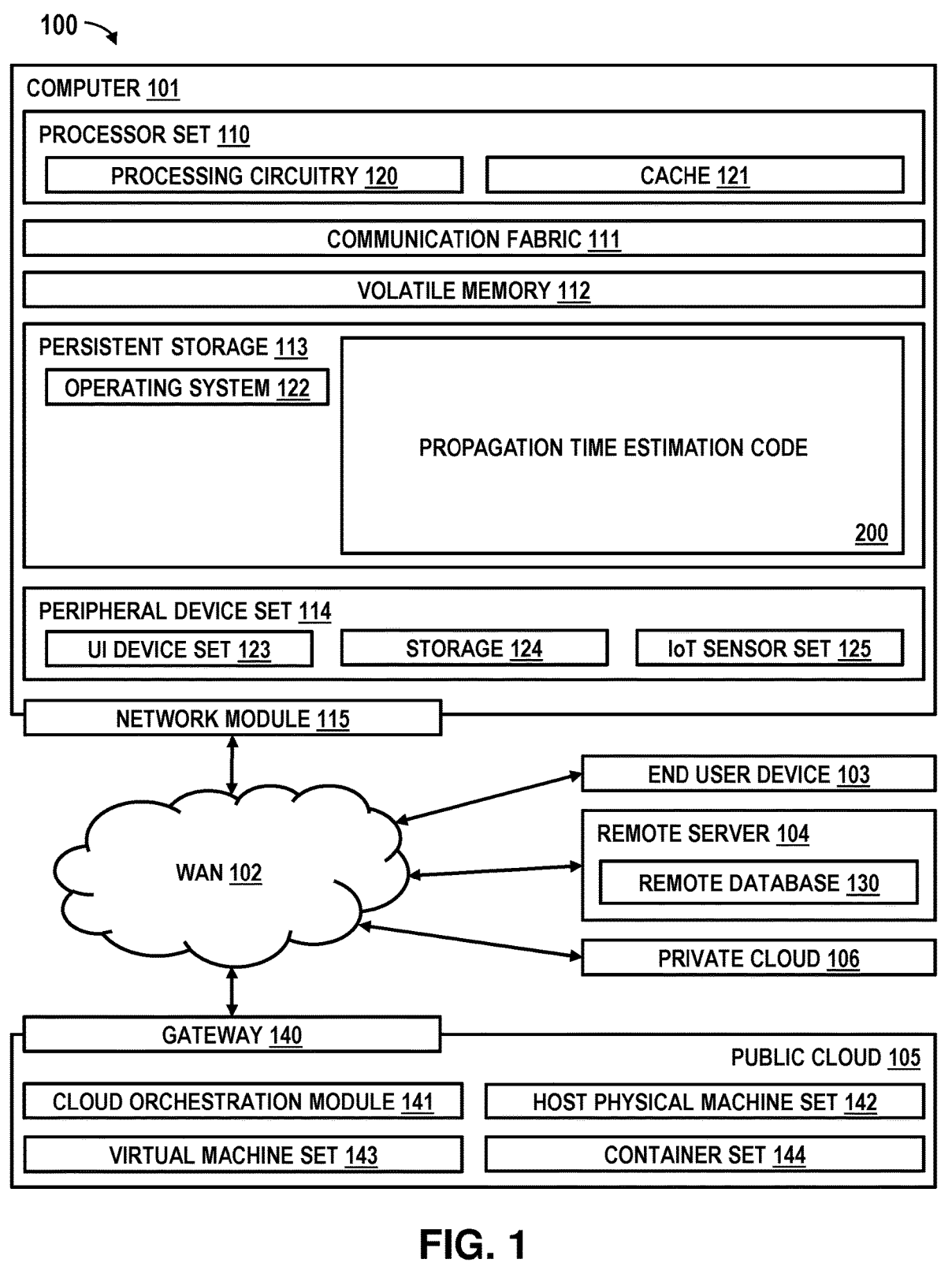

100 ⬎

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

PROPAGATION TIME ESTIMATION CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

FIG. 1

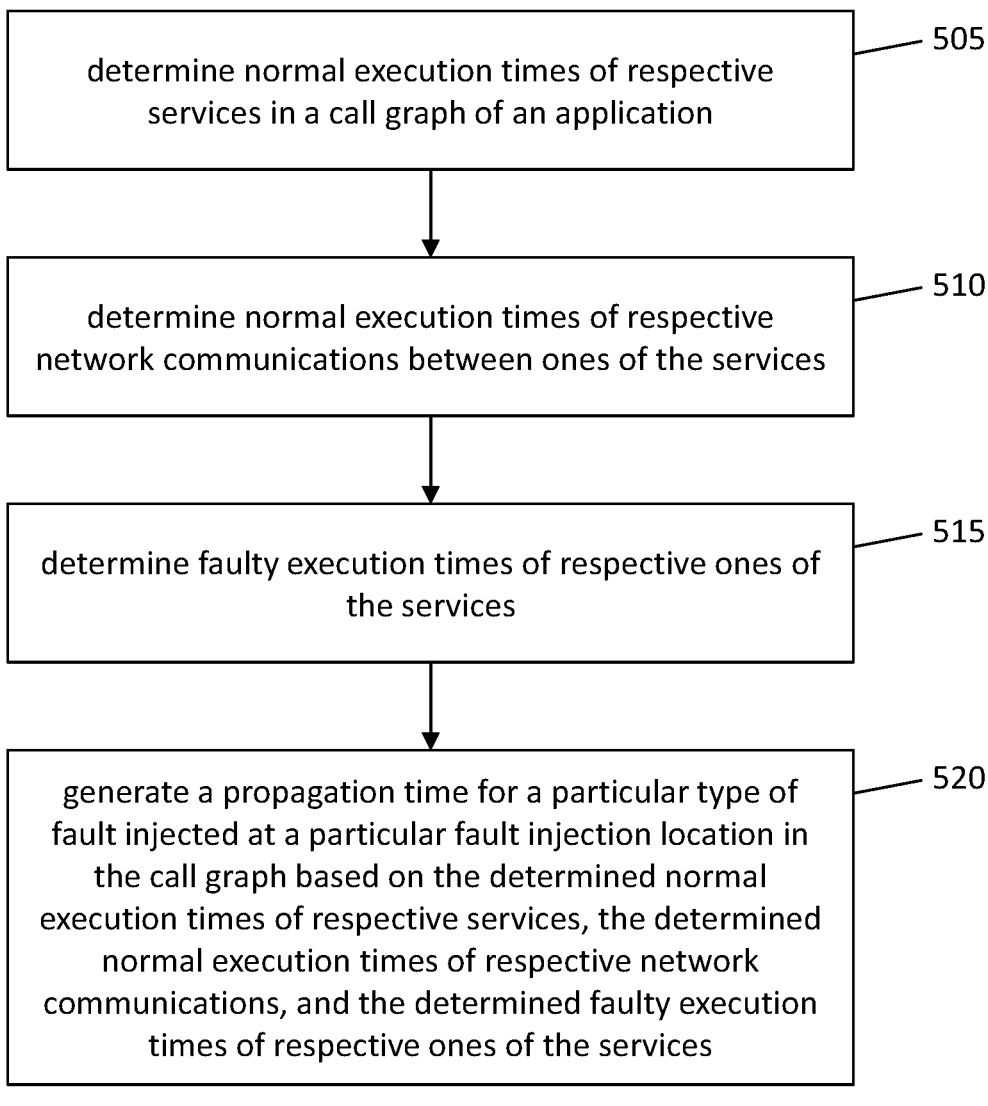

determine normal execution times of respective
services in a call graph of an application — 505 determine normal execution times of respective
network communications between ones of the services — 510 determine faulty execution times of respective ones of
the services — 515 generate a propagation time for a particular type of
fault injected at a particular fault injection location in
the call graph based on the determined normal
execution times of respective services, the determined
normal execution times of respective network
communications, and the determined faulty execution
times of respective ones of the services — 520

FIG. 5

ESTIMATING PROPAGATION TIME FOR AN INJECTED FAULT

BACKGROUND

Aspects of the present invention relate generally to information technology (IT) operations management and, more particularly, to estimating propagation time for an injected fault.

Fault injection is a testing technique in which faults, or failures, are deliberately introduced and injected into systems under test. Among other things, this enables testers to explore the causal effects of particular faults. Estimating the time it takes for the effects of a given injected fault to manifest is valuable to a tester since it enables the tester to focus on events occurring in a specific time period, and thereby reduces the amount of data to be examined. Fault injection is a tool that can be used to test the resilience of microservice-based applications. Microservices or a microservice architecture typically refer to a computer environment in which an application is built as a suite of modular components or services based on function definitions, and each running its own process and communicating by way of lightweight mechanisms. In certain microservice architecture, data is stored outside of the service, and as such the service is stateless, and these services or components are commonly referred to as "atomic services". Each atomic service is a lightweight component for independently performing a modular service; each atomic service supports a specific task and uses a defined interface, such as an application programming interface (API) to communicate with other services. The microservice architecture supports and enables scalability in a hybrid network.

Generally, microservices are an architectural approach, often cloud native, in which a single application is composed of multiple loosely coupled and independently deployable smaller components or services, referred to as microservices. The microservices typically (but not necessarily) have their own stack, inclusive of a database and data model, communicate with one another over a combination of representational state transfer (REST) application program interfaces (APIs), and are organized by business entity. Industrial microservice applications have hundreds or more microservices, some of which have dependent relationships. As the quantity of application microservices expands, the dependency relationships among the microservices grow in complexity. The topology of the application's microservices may be fixed, but is often unknown.

SUMMARY

In a first aspect of the invention, there is a computer-implemented method including: determining, by a processor set, normal execution times of respective services in a call graph of an application; determining, by the processor set, normal execution times of respective network communications between ones of the services; determining, by the processor set, faulty execution times of respective ones of the services; generating, by the processor set, a propagation time for a particular type of fault injected at a particular fault injection location in the call graph based on the determined normal execution times of respective services, the determined normal execution times of respective network communications, and the determined faulty execution times of respective ones of the services.

In another aspect of the invention, there is a computer program product including one or more computer readable storage media having program instructions collectively stored on the one or more computer readable storage media. The program instructions are executable to: determine normal execution times of respective services in a call graph of an application; determine normal execution times of respective network communications between ones of the services; determine faulty execution times of respective ones of the services; and generate a propagation time for a particular type of fault injected at a particular fault injection location in the call graph based on the determined normal execution times of respective services, the determined normal execution times of respective network communications, and the determined faulty execution times of respective ones of the services.

In another aspect of the invention, there is a system including a processor set, one or more computer readable storage media, and program instructions collectively stored on the one or more computer readable storage media. The program instructions are executable to: determine normal execution times of respective services in a call graph of an application; determine normal execution times of respective network communications between ones of the services; determine faulty execution times of respective ones of the services; and generate a propagation time for a particular type of fault injected at a particular fault injection location in the call graph based on the determined normal execution times of respective services, the determined normal execution times of respective network communications, and the determined faulty execution times of respective ones of the services.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 5 shows a flowchart of an exemplary method in accordance with aspects of the present invention.

DETAILED DESCRIPTION

Figure 2:
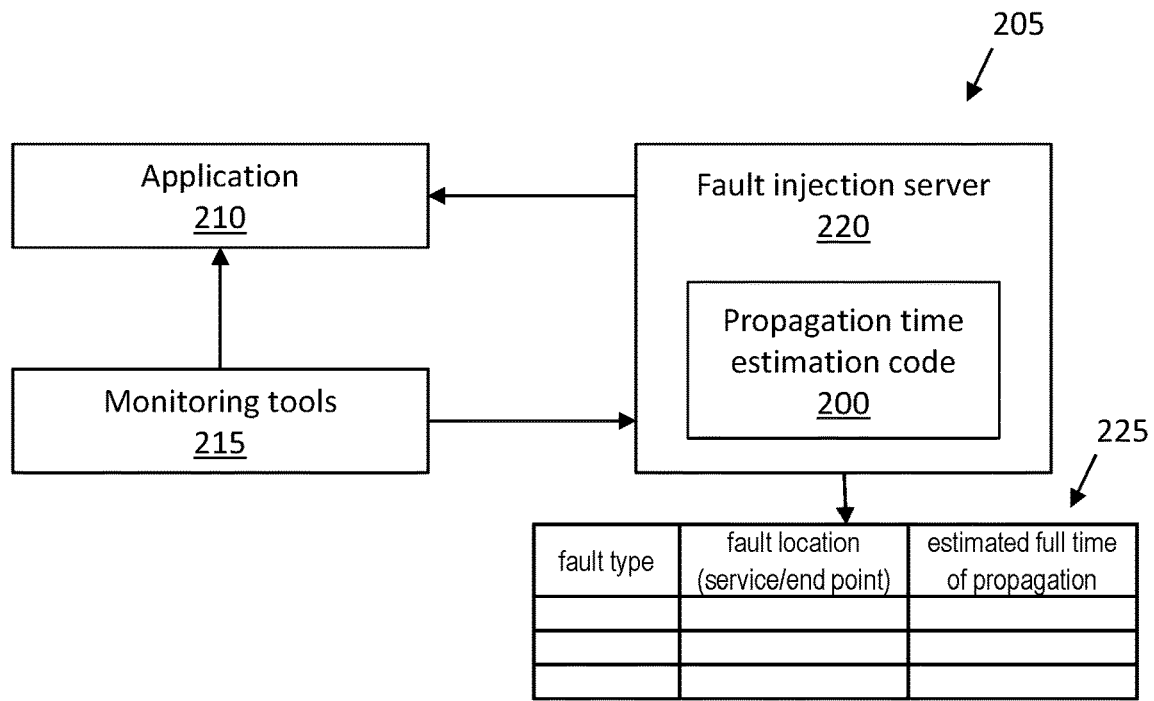
FIG. 2 shows a block diagram of an exemplary environment in accordance with aspects of the present invention.

Aspects of the present invention relate generally to information technology (IT) operations management and, more particularly, to estimating propagation time for an injected fault. Fault injection (FI) is commonly used for evaluating the resilience of systems. Existing FI approaches, however, involve a significant amount of manual decision making, such as determining, for example, what type of errors should be injected, when a fault should be injected, which object, component, process, and/or software-stack-level should be the target of the fault injection, which value and/or variable in the target object, component, process, and/or software-stack-level should be injected with what erroneous value, and what workload should be used for fault injection trials.

Faults are typically injected under the assumption that an application under duress will exhibit some issues immediately and continuously. However, these assumptions are not true in all situations. For example, some applications have resiliency that can withstand an injected fault for a period of time longer than that provided for in the test. In another example, an application can incorporate some services which have delayed execution, for example, every 15 minutes. In these situations, and others, the assumption that an application exhibits issues immediately (e.g., within less than a minute) upon the injection of a fault is misplaced. Furthermore, learning from execution of continuous fault injections assumes that data collected during fault execution represents the full scope of application symptoms under the faults, which could lead to an inaccurate and/or insufficient representation of application behavior. The time for the full extent of fault propagation depends on application architecture and communication between modules/services in the application. Synchronous vs asynchronous communication, message queues, etc., make it difficult to estimate the time required for a fault to affect all the modules/services that it will ultimately affect.

Implementations of the invention address these problems by providing a system, method, and computer program product configured to estimate a time for full propagation of a fault in an application. Embodiments enable a test design that combines what happens before a fault with an estimation of fault propagation. Embodiments include a system, method, and computer program product configured to model time of a fault propagation in complex applications (e.g., service networks) by: modeling the service (e.g., microservice) execution times and interconnection times based on distribution of application/service-networks execution time; measuring faulty execution time of a service (e.g., the point of fault injection) only experimentally by running fault injection experiments; when the focus is on tail events representing a service level objective (SLO) violation, making use of statistical methods from Extreme Value Theory (EVT) to estimate the probability of these events; and calculating the estimated full propagation time independent of the fault type (e.g., for a given fault type either service execution times or interconnection times are changing).

In accordance with aspects of the present invention, a system, method, and computer program product are configured to obtain a call graph for an application in which services and network communications are represented as nodes. In embodiments, the system, method, and computer program product are configured to profile a normal execution time (NET) for each application service in the call graph, where the normal execution time of each service may vary due to request data and state of environment, and where the normal execution time for each service is determined as a statistical distribution. The NET for each service may be collected from tracing, for example. In embodiments, the system, method, and computer program product are configured to estimate how an injected fault of a particular type and at a particular injection location affects the service execution time of the service at the injection location. This time may be referred to as a faulty execution time (FET). Different FETs for different types of faults injected at different locations may be estimated experimentally by running fault injection experiments with a simulation of the application in a staging environment. In embodiments, when the focus is on tail events representing an SLO violation, the probability of these events may be estimated using statistical methods from Extreme Value Theory (EVT). In embodiments, the system, method, and computer program product are configured to account for parallel processing of requests (e.g., parallelism) that may be present in many microservice based applications. In embodiments, the system, method, and computer program product are configured to use the application call graph, distributions of execution times for faulty service (e.g., the FETs), and distributions of normal execution times for (e.g., the NETs), for the rest of application service, to estimate an overall fault propagation time based on type of connection/switch between nodes (e.g., merge, split, joint, etc.).

In embodiments, a sample implementation may include limiting the fault parameter space (e.g., using combinatorial test design); measuring the impacts of combinations of faults; measuring in opaque-box mode to obtain a distribution and non-parametric confidence intervals where, depending on the fault type, either service execution times or interconnection times are changing; and replaying, e.g., finding approaches for replay given that the system has partial control such as using a starting point Lamport time to complete control over a send/receive framework.

Combinatorial test design reduces a test space defined by a Cartesian product of parameter values to a small set that contains the interaction of say each possible two parameter values. In the context of fault injection, a fault may be determined by a set of parameter values thus defining a Cartesian product of possible realization of the fault. For example, if the fault is a delay introduced on three consecutive edges of a communication graph, e1, e2, and e3, then three parameters control the length of the delay on e1, e3, and e3 respectively. Embodiments apply combinatorial design to the cartesian product of possible delays over the delays introduced on e1, e2, and e3 respectively to effectively estimate the delay propagation associated with the delay.

Embodiments may be used in IT operations management including but not limited to: generating model training data (e.g., by injecting faults to generate labeled operational data for training Artificial Intelligence for IT Operations (AIOps) related models); model verification (e.g., by simplification of data collection for validation of AI models); integration testing (e.g., by injecting faults as part of application integration testing to verify that an application "fails gracefully" and that application logging happens on the correct level); completeness of observability (e.g., by injecting faults and running AIOps to determine whether required data to detect/localize a fault is collected); and automation verification (e.g., to verify the effectiveness of runbook automation for given injected faults).

In an exemplary implementation, embodiments of the present disclosure may be used in generating training data for supervised training of machine learning models that are used to predict a fault occurring in an application based on log data of the application. For example, embodiments of the present disclosure may be used with an automated fault injection service that injects faults into an application in a staging environment, observes events (e.g., in log data) that occur as a result of the injected fault, and uses the observed log data as training data to train a machine learning model (e.g., an AIOps model) to learn (e.g., associate) particular patterns of events in the log data with particular faults at particular locations in the application. The trained machine learning model may then be used in a production environment of the application to predict that a particular fault is occurring at a particular location in the application based on events observed in the real-time log data of the application. Embodiments of the present disclosure may be used to define an optimum amount of log data to include in the training data, where the optimum amount is based on an estimated propagation time for an injected fault of a particular type and at a particular injection location as described herein. The ability to predict the type and location of a fault in an application using a machine learning model reduces the time and effort involved in manually reviewing log data to locate the fault. Implementations of the invention provide an improvement in the field of IT operations management by optimizing the generation of training data that is used to train such machine learning models.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as propagation time estimation code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment 205 includes an application 210 that is deployed in a hybrid cloud computing environment. In an embodiment, the application 210 comprises a hybrid cloud application that utilizes multiple microservices that perform respective functions of the application. The term hybrid cloud application refers to an application that deployed on combination of public and private resources like on public and private cloud for example. It may utilize technologies like microservices, container orchestrators, and auto scaling.

In embodiments, the environment 205 includes one or more monitoring tools 215 that monitor the application 210 and obtain observability data about the application 210 based on the monitoring. The observability data may include traces, metrics, and logs, for example, which are referred to as the pillars of observability as understood by those of ordinary skill in the art. Logs are files that record events, warnings, and errors as they occur within a software environment. Metrics are quantifiable measurements that reflect the health and performance of applications or infrastructure. A trace is data that tracks an application request as it flows through the various parts of an application.

In accordance with aspects of the invention, the environment 205 includes a fault injection server 220 that runs the propagation time estimation code 200 of FIG. 1. The server 220 may comprise one or more instances of computer 101 of FIG. 1. The server 220 may alternatively comprise one or more virtual machines or one or more containers running on one or more instances of computer 101 of FIG. 1. In an exemplary implementation, the application 210 is part of the public cloud 105 or private cloud 106 of FIG. 1, the monitoring tools 215 run on one or more remote servers 104 of FIG. 1, and the server 220 communicates with the application 210 and the monitoring tools 215 via one or more networks such as the WAN 102 of FIG. 1.

The propagation time estimation code 200 may comprise routines, programs, objects, components, logic, data structures, and so on that perform particular tasks or implement particular data types to carry out the functions and/or methodologies of embodiments of the invention as described herein. The propagation time estimation code 200 is executable by the processing circuitry 120 of FIG. 1 to perform the inventive methods as described herein. The server 220 may include additional or fewer code modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the propagation time estimation code 200 is configured to: determine normal execution times of respective services in a call graph of an application; determine normal execution times of respective network communications between ones of the services; determine faulty execution times of respective ones of the services and network communication; and generate a propagation time for a particular type of fault injected at a particular fault injection location in the call graph based on the determined normal execution times of respective services, the determined normal execution times of respective network communication, and the determined faulty execution times of respective ones of the services. In embodiments, the propagation time estimation code 200 repeats the generating for each of plural different types of faults and each of plural different fault injection locations in the application 210, and generates a list 225 comprising multiple entries, wherein each entry includes: a respective one of the plural different types of faults; a respective one of the plural different fault injection locations; and the generated propagation time for the combination of the respective one of the plural different types of faults and the respective one of the plural different fault injection locations. In this manner, the propagation time estimation code 200 outputs a list 225 that lists multiple different types of faults injected at multiple different locations in the application and an estimated full time of propagation for each particular fault type and injection location. The list 225 may be used in IT operations management, such as for generating training data that is used to train a machine learning model that is configured to predict a fault type and a fault location of the application based on an input comprising log data of the application.

Figure 3:
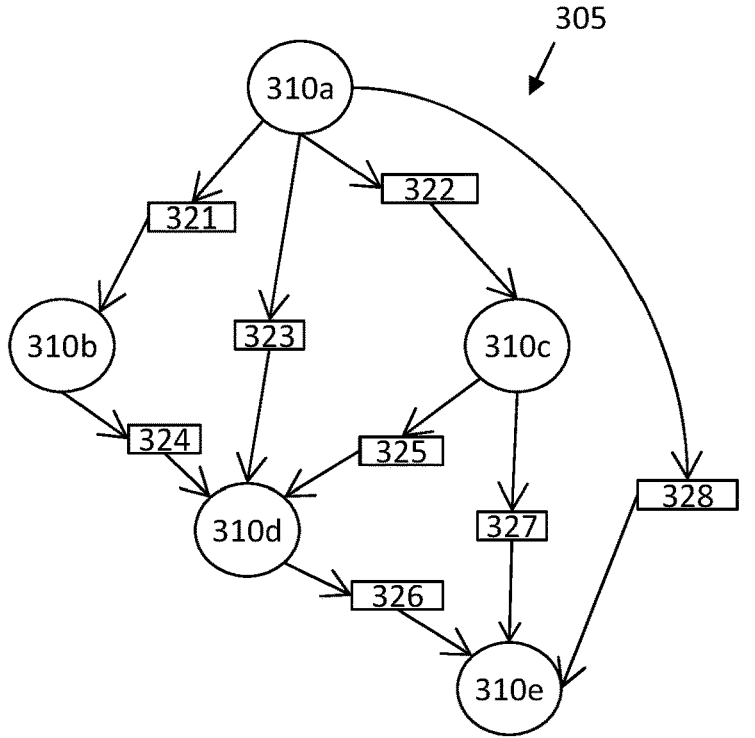
FIG. 3 shows an exemplary call graph in accordance with aspects of the present invention.

FIG. 3 shows an exemplary call graph 305 in accordance with aspects of the present invention. In embodiments, the nodes 310*a*, 310*b*, 310*c*, 310*d*, 310*e* of the call graph 305 represent microservices or network communications of the application 210. As used herein, network communications comprise network processing at network nodes and transmission between the nodes. In embodiments, the paths 321-328 of the call graph 305 represent direction of request flow (e.g., directionality of execution) between the microservices of the application 210. In this manner, the network communications include directionality of execution between the respective ones of the multiple microservices and network. In embodiments, the propagation time estimation code 200 automatically generates a call graph, such as call graph 305, for the application 210.

Figure 4:
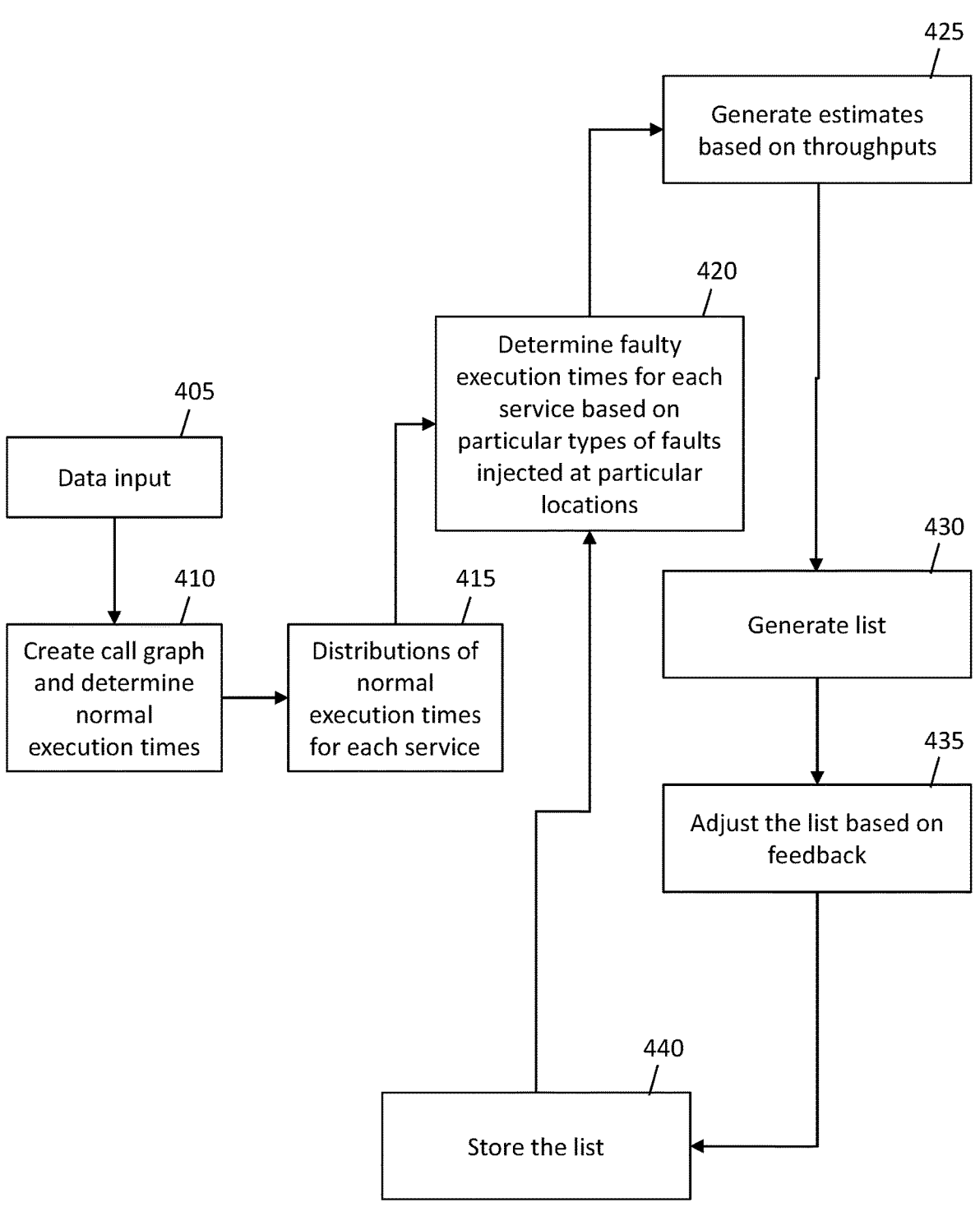
FIG. 4 shows an exemplary functional block diagram in accordance with aspects of the present invention.

FIG. 4 shows an exemplary functional block diagram in accordance with aspects of the present invention. Block 405 represents an input to the propagation time estimation code 200. The input may comprise a call graph 305 for the application 210 and a fault to inject at a fault injection location (e.g., in the call graph 305). Block 410 represents creating the call graph 305 if it is not included in the input at block 405. Block 410 also comprises identifying the normal execution times of the services and network communications in the call graph 305. In embodiments, the propagation time estimation code 200 determines these normal execution times using tracing, e.g., from the monitoring tools 215. Block 415 represents a distribution (e.g., statistical distribution) of the determined normal execution times for each service/network communication from block 410. In embodiments, the propagation time estimation code 200 determines the distribution of each service/network communication using multiple instances of tracing data for that service/network communication. Block 420 represents determining faulty execution times of respective ones of the services of the call graph 305 based on particular types of faults injected at particular locations in the call graph 305. Different types of faults may include, for example and without limitation: HTTP faults (e.g., requests are answered with HTTP status 503, service unavailable); HTTP-delay; HTTP-bad-request; HTTP-unauthorized; HTTP-forbidden; HTTP-not-found; HTTP-method-not-allowed; HTTP-not-acceptable; HTTP-internal-server-error; HTTP-bad-gateway; HTTP-service-unavailable; HTTP-timeout; and circuit-break. In embodiments, the faulty execution time of a respective one of the services (e.g., 310*a*) is determined using a simulation of the application 210 and injecting the particular type of fault (e.g., HTTP status 503) at the respective one of the services nodes (e.g., 310*a*) or network-delay or packet-corruption for example for network nodes and measuring the service/network time using tracing.

With continued reference to FIG. 4, block 425 represents generating (e.g., estimating) a propagation time for a particular type of fault injected at a particular fault injection location in the call graph based on the determined normal execution times of respective services, the determined normal execution times of respective network communications, and the determined faulty execution times of respective ones of the services. In embodiments, the generating comprises estimating a time based on the determined distributions for the one or more services and network communications included between two endpoints.

In one example for two consecutive endpoints (e.g., 310*a* and 310*c*) with distributions $d_1$ and $d_2$ of the execution time respectively, parallelization numbers $n_1$ and $n_2$, and network communication time $d_3$ with parallelization $n_3$, the overall time can be expressed as shown in Equation 1.

$$t = \frac{1}{\dfrac{d_1}{n_1} + \dfrac{d_2}{n_2} + \dfrac{d_3}{n_3}} = \frac{1}{\dfrac{1}{t_1} + \dfrac{1}{t_2} + \dfrac{1}{t_3}} \qquad \text{(Equation 1)}$$

In the example shown in Equation 1, if the fault is injected at node 310*a*, then $d_1$ is the faulty execution time for node 310*a* for this type of fault, e.g., as determined at block 420. In this example, $d_2$ is the normal execution time of node 310*c* and $d_3$ is the normal execution time of network communication along 322, each as determined at block 410.

The method also allows calculating of lower and upper bounds of the execution time for specific fault propagation at the given node. Lower bound comprise the time when fault does not propagate, hence no effect on other normal times; upper bound comprise a sum of FET for all nodes (under assumption that fault propagates to all nodes).

In another example for a merge of two branches where nodes are executed concurrently (e.g., 310*b* and 310*c*) with distributions $d_1$ and $d_2$ of the execution time and parallelization numbers $n_1$ and $n_2$, the overall time can be expressed as shown in Equation 2.

$$t = \frac{1}{\min\left(\dfrac{d_1}{n_1} + \dfrac{d_2}{n_2}\right) + \dfrac{d_3}{n_3}} \qquad \text{(Equation 2)}$$

Equation 3 shows as expression for estimating the time of a switch:

$$t = \frac{1}{\max\left(d_1/n_1 + d_2/n_2\right)} = \min(t_1, t_2) \qquad \text{(Equation 3)}$$

In Equations 1-3 above, time (t) refers to the total amount of time that it takes to run a particular request/process, $d_i$ is a distribution time of processing within node i, and $n_i$ is a parallelization number of processing at the node i. Equations 1-3 are examples of individual times. In embodiments, the propagation time estimation code 200 determines such an equation for each interaction between nodes in the call graph 305. Then, for a particular fault that is injected at a particular location in the call graph 305, the propagation time estimation code 200 uses the appropriate equations to estimate the individual times from the fault injection point to the last node in the call graph, and adds these estimated individual times to generate an overall propagation time for this particular type of fault and this particular fault injection location. In embodiments, the propagation time estimation code 200 repeats this for plural different types of faults at plural different fault injection locations in the call graph 305 and generates the list 225 with the results.

With continued reference to FIG. 4, block 430 represents the list 225 that is output by the propagation time estimation code 200. Block 435 represents feedback that may be received from a subject matter expert (SME) via a user interface, for example. In embodiments, the propagation time estimation code 200 adjusts one or more entries in the list 225 based on the feedback. In one example, the propagation time estimation code 200 adjusts the propagation time of one or more entries in the list 225 based on the feedback. In another example, the propagation time estimation code 200 adjusts the list 225 based on the feedback by adding a new entry to the list, e.g., a combination of fault type and fault injection location that is not currently included in the list, and then re-runs the process at block 425 to determine the propagation time for the new entry. Block 440 represents storing the list 225.

FIG. 5 shows a flowchart of an exemplary method in accordance with aspects of the present invention. Steps of the method may be carried out in the environment of FIG. 2 and are described with reference to elements depicted in FIG. 2.

At step 505, the system determines normal execution times of respective services in a call graph of an application. At step 510, the system determines normal execution times of respective network communications between ones of the services. At step 515, the system determines faulty execution times of respective ones of the services. At step 520, the system generates a propagation time for a particular type of fault injected at a particular fault injection location in the call graph based on the determined normal execution times of respective services, the determined normal execution times of respective network communications, and the determined faulty execution times of respective ones of the services.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, by a processor set, normal execution times of respective services in a call graph of an application;

determining, by the processor set, normal execution times of respective network communications between ones of the services;

determining, by the processor set, faulty execution times of respective ones of the services; and generating, by the processor set, a propagation time for a particular type of fault injected at a particular fault injection location in the call graph based on the determined normal execution times of respective services, the determined normal execution times of respective network communications, and the determined faulty execution times of respective ones of the services, wherein the faulty execution times of the respective ones of the services are determined by estimating a probability of a tail event representing a service level objective (SLO) violation using Extreme Value Theory (EVT).

2. The method of claim 1, where a fault is realized in different ways by optimization of combinatorial test design.

3. The method of claim 1, further comprising repeating the generating for each of plural different types of faults and each of plural different fault injection locations.

4. The method of claim 3, further comprising generating a list comprising multiple entries each comprising:

a respective one of the plural different types of faults;

a respective one of the plural different fault injection locations; and the generated propagation time for a combination of the respective one of the plural different types of faults and the respective one of the plural different fault injection locations.

5. The method of claim 4, further comprising adjusting one or more entries of the list based on feedback.

6. The method of claim 1, wherein:

the application comprises hybrid cloud application that includes multiple microservices;

the services in the call graph correspond to respective ones of the multiple microservices and network communications; and the network communications include directionality of execution between the respective ones of the multiple microservices and network.

7. The method of claim 1, wherein the normal execution times of the respective services are determined using tracing.

8. The method of claim 7, wherein the normal execution times of the respective services and network nodes comprise statistical distributions.

9. The method of claim 1, wherein the normal execution times of the respective network communications are determined using tracing and comprise statistical distributions.

10. A method, comprising:

determining, by a processor set, normal execution times of respective services in a call graph of an application;

determining, by the processor set, normal execution times of respective network communications between ones of the services;

determining, by the processor set, faulty execution times of respective ones of the services; and generating, by the processor set, a propagation time for a particular type of fault injected at a particular fault injection location in the call graph based on the determined normal execution times of respective services, the determined normal execution times of respective network communications, and the determined faulty execution times of respective ones of the services, wherein the generating the propagation time is further based on one or more parallelization numbers.

11. A computer program product comprising one or more computer readable storage media having program instructions collectively stored on the one or more computer readable storage media, the program instructions executable to:

determine normal execution times of respective services in a call graph of an application, wherein nodes of the call graph represent microservices in the application and paths between the nodes represent direction of request flow between the microservices;

determine normal execution times of respective network communications between ones of the services;

determine faulty execution times of respective ones of the services by running fault injection simulations; and generate a propagation time for a particular type of fault injected at a particular fault injection location in the call graph based on the determined normal execution times of respective services, the determined normal execution times of respective network communications, and the determined faulty execution times of respective ones of the services, wherein the program instructions are further executable to:

repeat the generating for each of plural different types of faults and each of plural different fault injection locations; and generate a list comprising multiple entries each comprising:

a respective one of the plural different types of faults;

a respective one of the plural different fault injection locations; and the generated propagation time for a combination of the respective one of the plural different types of faults and the respective one of the plural different fault injection locations; and wherein the program instructions are further executable to:

generate training data based on the list; and train a machine learning model using the training data, wherein the machine learning model is configured to predict a fault type and a fault location of the application based on an input comprising log data of the application.

12. The computer program product of claim 11, wherein:

the normal execution times of the respective services and the normal execution times of the respective network communications are determined using tracing.

* * * * *